ARCHIE JOHN HIRST
INVENTOR

ATTORNEY

Nov. 7, 1967 A. J. HIRST 3,351,308
RESILIENT MOUNTING
Filed Oct. 5, 1965 4 Sheets-Sheet 4

INVENTOR.
ARCHIE JOHN HIRST
BY
ATTORNEY

United States Patent Office 3,351,308
Patented Nov. 7, 1967

3,351,308
RESILIENT MOUNTING
Archie John Hirst, Leicester, England, assignor to Metalastik Limited, Leicester, England, a British company
Filed Oct. 5, 1965, Ser. No. 492,996
Claims priority, application Great Britain, Oct. 6, 1964, 40,657/64
9 Claims. (Cl. 248—22)

ABSTRACT OF THE DISCLOSURE

A top, machine-carrying part and a base are each formed with confronting surface portions having overlapping and non-overlapping parts; a tubular or cylindrical rubber spring insert is placed between the confronting parts so as to be engaged, when unloaded, by the non-overlapping surface portions and, under loading, resiliently deforming to progressively engage between the overlapping surface portion so that the bearing area of the rubber spring cylinder increases in proportion to the vertical loading.

Figure 1:
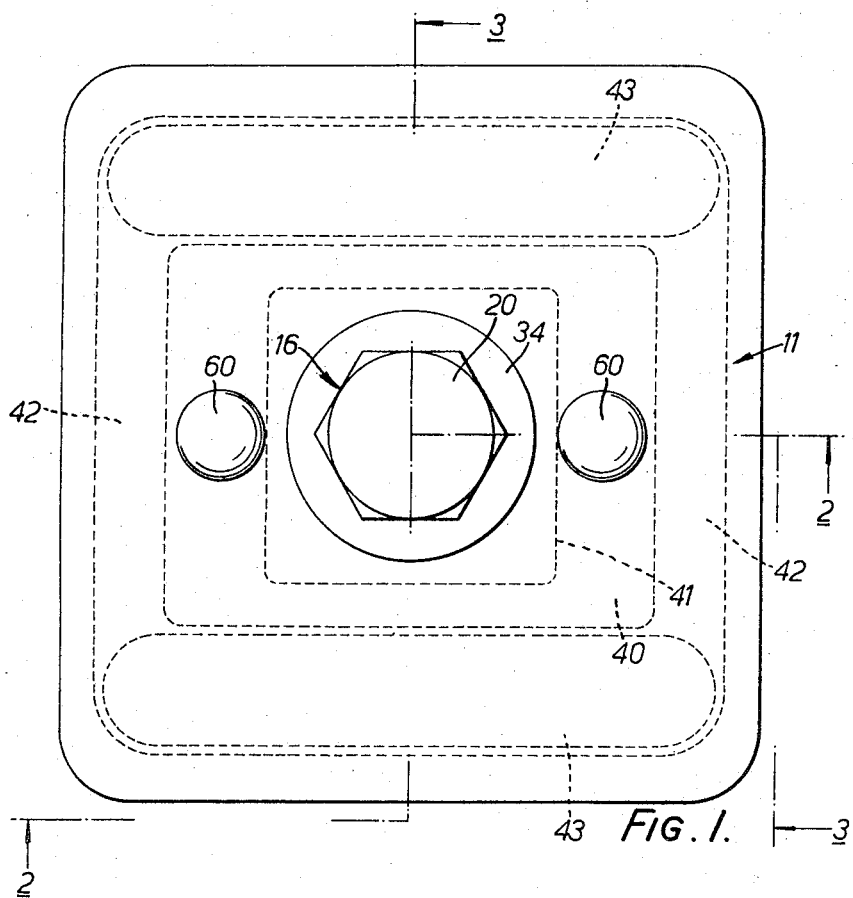

This invention relates to resilient mountings or load supports of the kind comprising a rigid base, usually of metal, to stand upon or be secured to a floor surface or bed, a rigid upper part usually of metal, to carry a machine or other object (hereafter referred to as "a machine") to be supported and rubber or the like material (hereinafter referred to as rubber) spring means interposed between the base and the upper part resiliently to maintain them in spaced relation.

Such mountings are commonly used as anti-vibration mountings for machinery. When mounting the machinery it is seldom that the position of the centre of gravity of the machine is accurately known nor is the floor surface always flat. In order to level the machine therefore some form of height adjustment means is conveniently incorporated in the mountings. In the result the loading placed on the individual anti-vibration mountings of a levelled machine is not exactly predictable.

The object of the present invention is to provide a resilient mounting or support of the kind described in which the vertical stiffness of the mounting remains approximately proportional to the load applied to the mounting whereby upon levelling a machine on such mountings, isolation of machine vibration by the mountings can be far more satisfactorily predicted because the vertical stiffnesses of the mountings remains substantially the same regardless of variations in static load applied to the mountings by the machine due to the levelling operation.

According to the invention there is provided a resilient mounting or support of the kind described in which the rubber spring means is arranged to be loaded between confronting surfaces on the base and the upper part, said surfaces having surface portions (hereinafter termed "overlapping surface portions") which lie vertically one above the other in use of the mounting, the shape of the base, the upper part of the mounting and the rubber spring means being such that the area of contact between said overlapping surface portions and the rubber spring means progressively increases as the load on the mounting is increased.

The spring means preferably comprises a pair of generally round sectioned (for example, cylindrical) rubber inserts arranged in spaced relation one along each of two opposite sides of the mounting. The mounting may incorporate a further pair of such inserts arranged in spaced relation and one along each of the other two opposite sides of the mounting. Each pair of inserts is conveniently straight and parallel, the pairs of inserts where two pairs are provided, extending normal to each other.

In the most convenient form, each rubber insert is of truly circular cross-section in its free condition and, in the unload condition of the mounting, engages, over opposite diagonal quadrants of its cylindrical outer surface defined between the vertical and horizontal planes containing its cylindrical axis, correspondingly shaped cylindrical surfaces on the upper part of the mounting and the base of the mounting respectively, said correspondingly shaped cylindrical surfaces joining smoothly in the vertical plane containing the cylindrical axis of the insert, with flat surfaces on the upper part of the mounting and the base, each of said flat surfaces and one of the correspondingly shaped cylindrical surfaces together constituting overlapping surface portions as defined above.

Figure 2:
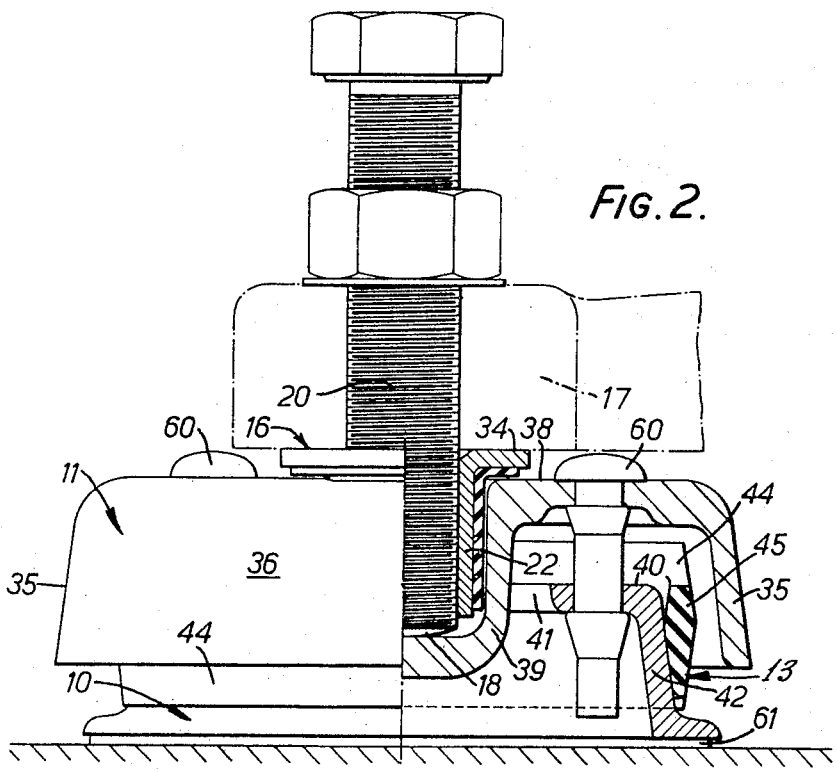
Figure 3:
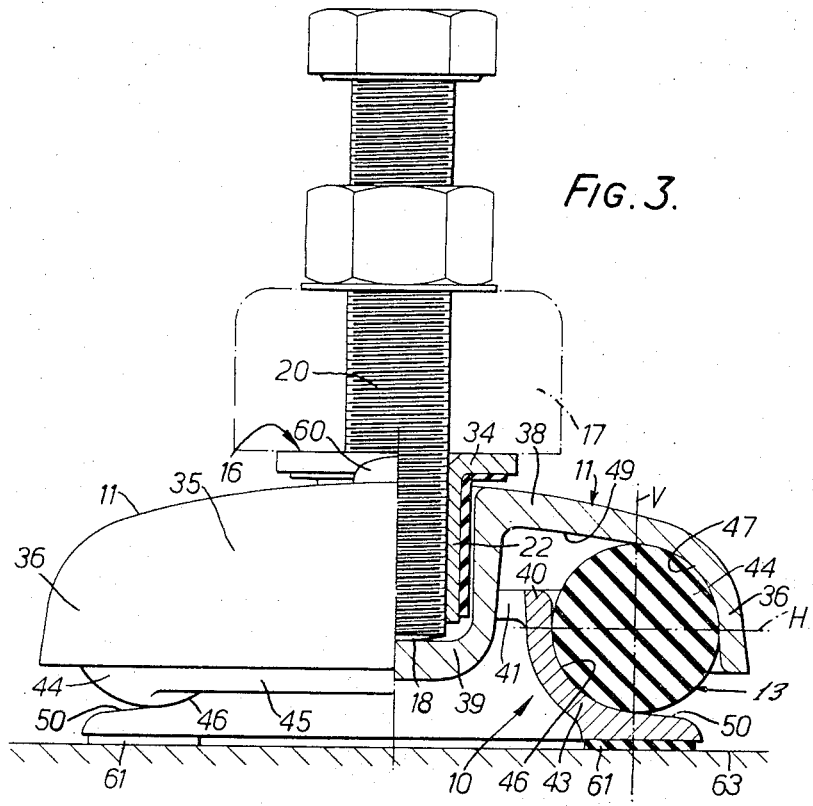
Figure 4:
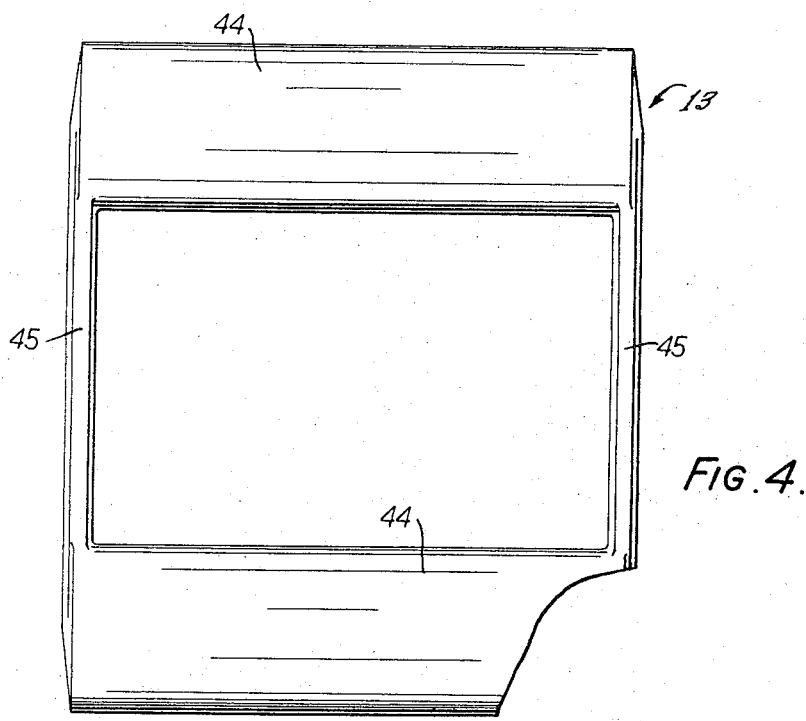
Figure 5:
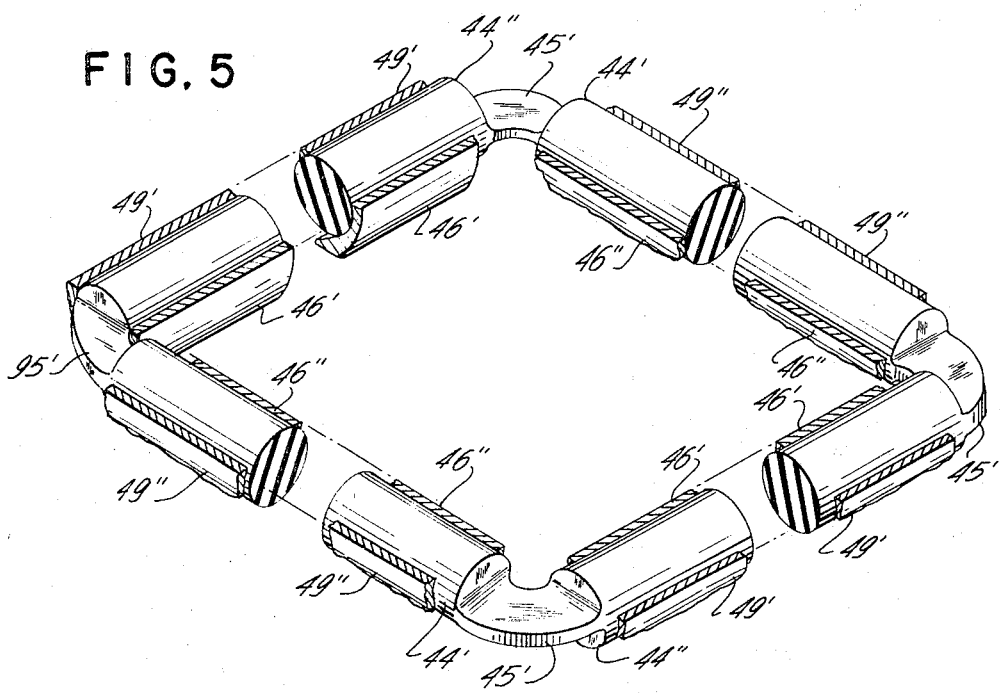
Figure 6:
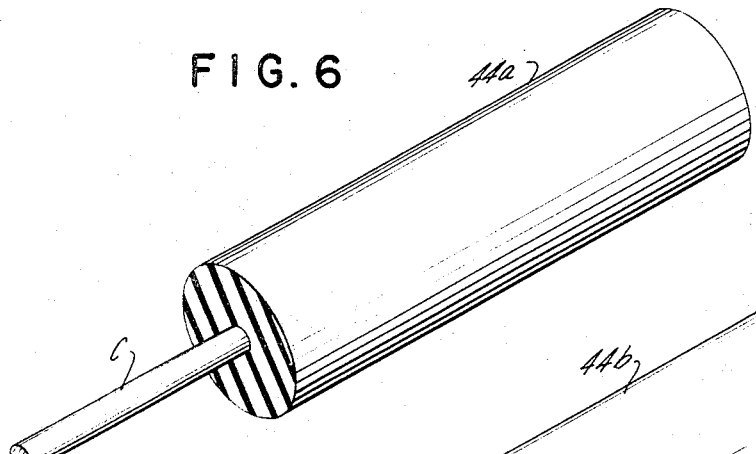
Figure 7:
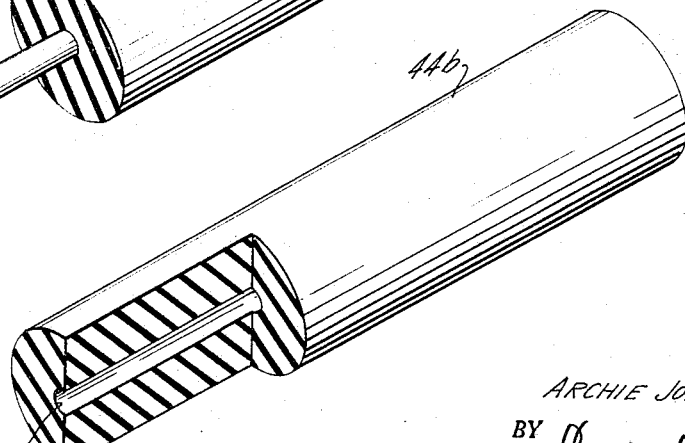

A specific embodiment of the present invention will now be described, merely by way of example, with reference to the accompanying drawings in which:

FIG. 1 is a plan view of the mounting.
FIG. 2 is a view on line 2—2 in FIG. 1.
FIG. 3 is a view on line 3—3 in FIG. 1, and
FIG. 4 is a plan view of a part of the mounting.
FIG. 5 is a perspective view of a different embodiment of the rubber insert; and
FIGS. 6 and 7 are perspective views of other views of the rubber inserts themselves.

Referring to the drawings, the mounting comprises a rigid base casting 10, a rigid top casting 11 and a rubber spring means 13 (shown particularly in FIG. 4) interposed between the castings and resiliently maintaining them in spaced relation.

The top casting is provided centrally with a jacking means generally indicated at 16 which may be used for adjusting the height of a machine foot shown chain dotted at 17 in use of the mounting. The jacking means is as described in co-pending patent application No. 493,053, Harrison, assigned to the assignee of the present invention and comprises a flanged sleeve 22 the flange 34 of which supports the machine foot 17, the sleeve 22 being screwthreaded on to a bolt 20 the lower end of which engages against the top casting 11, as at 18, to transfer thereto the load of the machine foot 17. The levelling means as such forms no part of the present invention and any convenient arrangement of levelling means may be used, the levelling means not necessarily forming part of the mounting. Thus the top casting 11 may be formed simply as a platform to support the machine foot and it may have one or more bolt holes to secure the machine foot to it.

The mounting is shown in an unloaded condition; the top casting 11 and the base casting 10 are of square outline in plan view. The upper casting is of inverted dish form having opposite pairs of downwardly directed sides 35, 35 and 36, 36 extending from a top portion 38 having a central cast hole or well 39 which houses the jacking means.

The base 10 has a central pedestal 40 with a central aperture 41 which receives the well 39, of the top casting with a good clearance all around, the pedestal having opposite pairs of sides 42, 42 and 43, 43.

The rubber spring means comprises two straight, cylindrical inserts 44 arranged in spaced parallel relation one along each of the sides 43 of the pedestal 40 between the sides 43 and the sides 36 of the top casting. The inserts are conveniently interconnected by straps 45 at their ends, the straps lying along and engaging against the sides 42 of the pedestal clear of the confronting sides 35 of the top casting.

Each pair of sides 43, 36 presents part cylindrical surface portions 46, 47 which accurately fit against the outer cylindrical surface of their interposed insert 44 over the diametrically opposite quadrants of its surface defined between horizontal and vertical planes H and V (see FIG. 3) through the cylindrical axis of the insert. Smoothly joining with the part cylindrical surface portions along lines in the plane V are flat surface portions 49, 50 on the top casting and the base casting respectively. The surface portions 49, 50 lie out of contact with the inserts 44 in the unladen condition of the mounting but are brought progressively into contact with the inserts as the load on the mounting is increased. The surface portions 49, 50 are parallel with one another and inclined at a small angle to the horizontal as shown in FIG. 3.

Loading the mounting squashes the inserts out of their round shape the inserts taking on an increasingly elongated lozenge shape in cross-section until eventually the central portion 38 of the top casting engages the pedestal of the base 10.

The surface portions 49, 46 and the surface portions 47 and 50 on the top and base castings respectively are vertically spaced, one above and directly overlying the other so as to constitute overlapping surface portions. As the rubber inserts 44 are brought progressively into contact with such overlapping surface portions on the base and the top casting, the bearing area of the rubber inserts increases and likewise the vertical stiffness.

The described arrangement is such that increase of stiffness with the increase of load is approximately proportional to the increase of load over the designed load range within the limits intended by the invention.

The rubber spring means is formed as a one piece moulding. The straps 45 serve to ensure that common inserts 44 are always fitted to the mounting and to position the inserts 44 on the base casting during assembly of the mounting. They also act as buffers to prevent metal-to-metal contact between the sides 35, 42 of the top casing and the base pedestal respectively in two opposite directions. The straps do not play any part in vibration insulation.

The inserts 44 are of solid rubber section. In order to stiffen the mounting each insert may be a rubber element 44a (FIGURE 6) provided with a metal rod core C along its cylindrical axis. To soften the mounting, the rubber element, see 44b (FIG. 7) may have a hole H. Holes may be punched in the straps 45 in a readily visible position to denote the type of insert.

To secure the top casting to the base and to hold the rubber spring means in position for transit purposes two neoprene rubber or other suitable rubber pegs 60 shaped as illustrated are pulled through aligning holes in the castings. The pegs may be removed or not when the mounting is installed and may usefully be retained.

The base casting 10 is provided with friction strips 61 of polyurethane or nitrile rubber cemented or bonded to its under surface to engage the floor 63. Alternatively the base casting may be adapted to be bolted to the floor.

The mounting as described has a high horizontal stiffness transversely of the inserts 44 and a comparatively low horizontal stiffness in the direction of the cylindrical axes of the inserts. This characteristic may be employed with advantage in certain installations. If however the mounting is required to have equal stiffness in all horizontal directions a further pair of rubber inserts 44', 44" (FIG. 5) like the inserts 44 may be arranged along the other two opposite sides of the mounting between the top casting with interconnections 45 and the base casting, the castings being provided with overlapping surface portions 46', 49', 46", 49" like the surface portions 46, 49 and 47, 50 to engage the further pair of inserts.

The horizontal stiffness transversely of the inserts 44 is of the same order as the vertical stiffness in the illustrated example but may be made higher by varying the angle and extent of the flat surface regions to each side of the cylindrical surfaced portions 46, 47. The mountings may furthermore be designed so that a symmetrical arrangement of three or more of them used in a mounting system will give rise to a system having equal stiffnesses in all horizontal directions.

Instead of having cylindrical sufraced portions 46, 47 these could be replaced each by a single flat surface or a series of flat surfaces at different angles arranged so as to approximate to a cylindrical surface.

An arrangement according to the invention ensures that each rubber insert is in contact with the upper and lower rigid parts of the mounting at well spaced regions around its periphery, even under light loading conditions, whereby there is little or no tendency for the insert to roll between its loading surfaces when the mounting is deflected and any rolling which occurs contributes very little to the flexibility of the mounting.

I claim:

1. A resilient mounting comprising a rigid base part (10) adapted to be placed on a floor, a rigid upper part (11) adapted to carry a machine to be supported and rubber spring means (13) interposed between the base and the upper part to resiliently maintain said parts in spaced relation, confronting surfaces formed on said parts, said rubber spring means being arranged to be loaded between said confronting surfaces on the base and the upper part, said confronting surfaces having overlapping surface portions which are vertically spaced one directly above and overlying the other in use of the mounting, and non-overlapping surface portions which, in use of the mounting, are vertically spaced but horizontally offset from one another, the rubber spring means, in the unloaded condition of the mounting, being engaged solely between such non-overlapping surface portions of said confronting surfaces, the rubber spring means being progressively deformed to carry additional loading between such overlapping surface portions of said confronting surfaces under the action of vertical load on the mounting, whereby the bearing area of the rubber spring means between such overlapping surface portions increases in proportion to the vertical load.

2. A resilient mounting as claimed in claim 1 wherein the rubber spring means comprises a pair of round sectioned rubber inserts arranged, in spaced relation, one along each of two opposite sides of the mounting.

3. A resilient mounting as claimed in claim 2 wherein said inserts are straight and parallel with one another.

4. A resilient mounting as claimed in claim 1 wherein the rubber spring means comprises two pairs of round sectioned rubber inserts arranged, with each pair in spaced relation, one pair along each of two opposite sides of the mounting and the other pair along each of another two opposite sides of the mounting.

5. A resilient mounting as claimed in claim 4 wherein each pair of inserts is straight and parallel with one another and the the pairs of inserts extend normal to each other.

6. A resilient mounting as claimed in claim 2 wherein each rubber insert is of truly circular cross-section in its free condition and, in the unloaded condition of the mounting, engages over opposite diagonal quadrants of its cylindrical outer surface defined between the vertical and horizontal planes containing its cylindrical axis, correspondingly shaped cylindrical surfaces on the upper part of the mounting and the base of the mounting respectively, said correspondingly shaped cylindrical surfaces joining smoothly in the vertical plane containing the cylindrical axis of the insert with flat surfaces formed respectively on the upper part of the mounting and the base, each of said flat surfaces and one of the correspondingly shaped cylindrical surfaces together constituting a pair of said overlapping surface portions.

7. A resilent mounting as claimed in claim 2 wherein the rubber inserts are each provided with a metal rod core along its cylindrical axis.

8. A resilient mounting as claimed in claim 2 wherein the rubber inserts are each provided with a hole extending along its cylindrical axis.

9. A resilient mounting as claimed in claim 2 wherein the rubber spring means is formed in one piece, said round sectioned rubber inserts being interconnected by straps of rubber at their ends, the straps acting as buffers to limit the relative movement of said base and said rigid upper part of the mounting in two opposite directions.

References Cited
UNITED STATES PATENTS

| | | | |
|---|---|---|---|
| 2,147,660 | 2/1939 | Loewus | 248—22 |
| 2,697,578 | 12/1954 | Whittam | 248—358 |
| 2,941,766 | 6/1960 | Van Ranst | 248—10 |
| 3,008,703 | 11/1961 | Slemmons | 267—1 |

JOHN PETO, *Primary Examiner.*